United States Patent
Brantley et al.

[11] Patent Number: 6,153,331
[45] Date of Patent: Nov. 28, 2000

[54] BATTERY HANDLE HOLDDOWN

[75] Inventors: Randall F. Brantley, Indianapolis; Dane E. Carter, Noblesville, both of Ind.

[73] Assignee: Delphi Technologies, Inc., Troy, Mich.

[21] Appl. No.: 09/311,713

[22] Filed: May 14, 1999

[51] Int. Cl.$^7$ .................................................. H01M 2/10
[52] U.S. Cl. .................................. 429/187; 16/DIG. 15; 16/423
[58] Field of Search ...................... 429/187; 16/DIG. 15, 16/423

[56] References Cited

U.S. PATENT DOCUMENTS

| | | | |
|---|---|---|---|
| 2,453,835 | 11/1948 | Donkin | 429/187 X |
| 3,093,515 | 6/1963 | Rector | 429/187 X |
| 4,966,346 | 10/1990 | Karna et al. | 429/187 X |

FOREIGN PATENT DOCUMENTS 2087134  5/1982  United Kingdom ................... 429/187

Primary Examiner—John S. Maples
Attorney, Agent, or Firm—Margaret A. Dobrowitsky

[57] ABSTRACT

An automotive battery is positioned in a tray secured with the vehicle. The tray and the battery have cooperating extensions and projections which hold the battery in position on the tray. A pivotally mounted handle on the battery engages in notches on a vertical stanchion formed on the tray. The battery is secured in the tray through the cooperation of the extensions and projections and the handle and the stanchion. The handle has a pair of spaced notches in which the battery cables are secured to prevent relative movement between the battery and the cable terminal connections.

4 Claims, 4 Drawing Sheets

BATTERY HANDLE HOLDDOWN

TECHNICAL FIELD

This invention relates to automotive battery installations and more particularly to apparatus for securing a battery in position in a tray.

BACKGROUND OF THE INVENTION

Automotive batteries are usually located in the front of a vehicle near the engine. The battery is positioned in a tray which is secured to a body component of the vehicle. The battery is secured or otherwise held in the tray by external devices. In many installations, the tray has a lower rim and a top holddown bracket. The lower rim is secured to the vehicle and supports the battery. The top holddown bracket is placed around the upper edge of the battery and is secured to the lower rim by threaded fasteners.

At assembly, a worker must position the battery in the lower tray, position the upper tray and secure the fasteners. The battery cables can only be connected after the upper tray is in position. The positioning and manipulation of the fasteners take time and adds to the cost of production. If it becomes necessary to replace the battery, after a period of time, the process is reversed. The time and tools needed for the original installation and any needed replacement add to the cost associated with the battery.

During the life of the vehicle, the fasteners on the tray can become corroded such that removal is difficult and the fasteners may need replacement when a replacement battery is installed adding to the total lifetime costs of the installation.

SUMMARY OF THE INVENTION

It is an object of the present invention to provide an improved toolless installation structure and apparatus for an automotive battery.

In one aspect of the present invention, a battery tray has a plurality of holddown projections which cooperate with holddown extensions on the battery. In another aspect of the present invention, the holddown projections and extensions limit the vertical orientation of the battery in the tray. In yet another aspect of the present invention, a pivotally mounted member on the battery engages a vertical stanchion on the tray. In still another aspect of the present invention, the pivotally mounted member has a pair of retention recesses for engaging and retaining the battery cables.

In a further aspect of the present invention, the pivotally mounted member presents a handle for transporting the battery onto and off of the tray. In a yet further aspect of the present invention, a portion of the handle engages in recesses in the stanchion to limit horizontal movement of the battery. In a still further aspect of the present invention, the holddown features on the battery and tray and the handle and stanchion structures cooperate to provide a toolless securement for the battery.

DESCRIPTION OF AN EXEMPLARY EMBODIMENT

Figure 1:
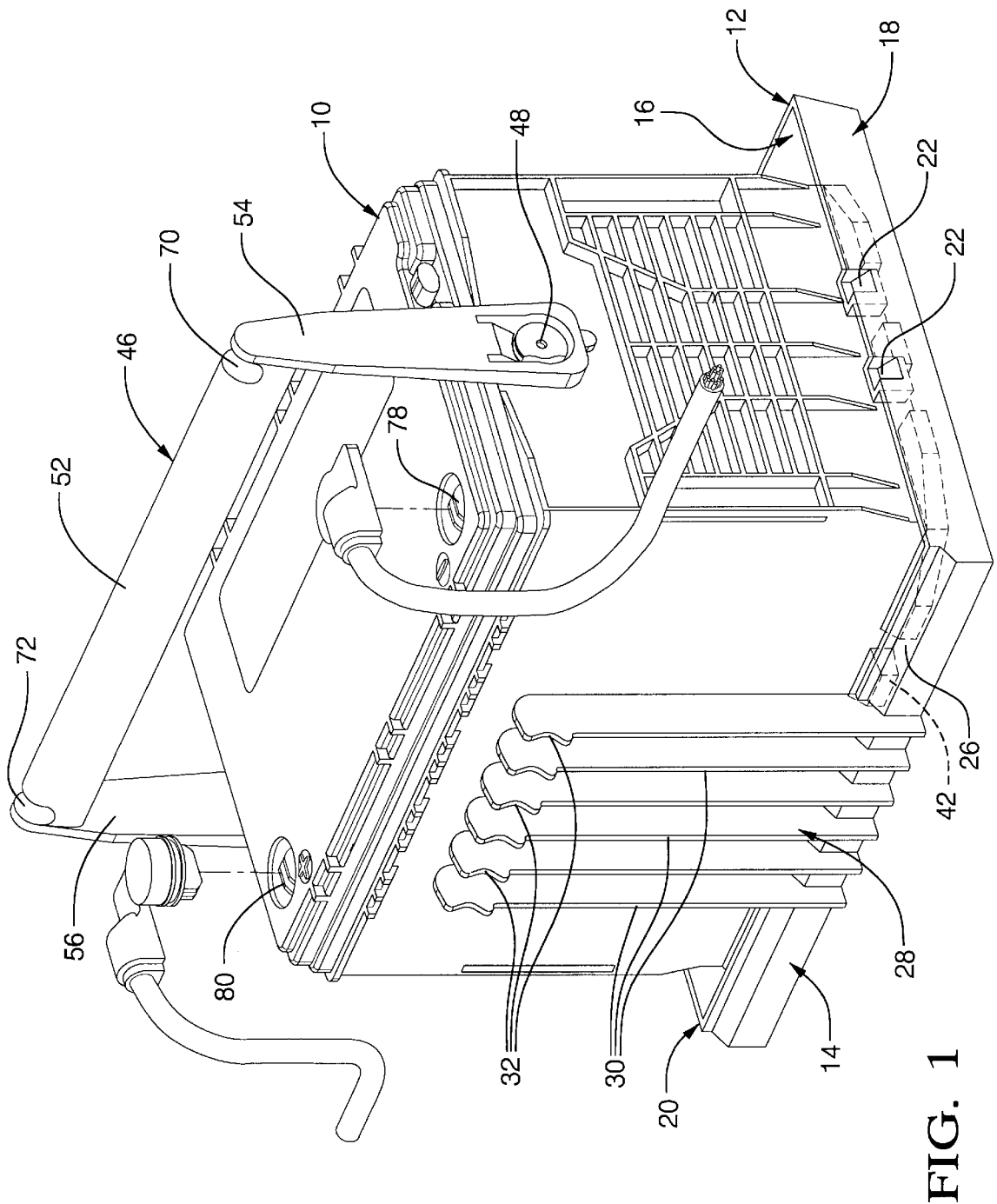
FIG. 1 is an isometric view of a battery partially installed in a tray incorporating the present invention.

Referring to the drawings wherein like characters represent the same or corresponding components throughout the several views there is seen in FIG. 1 a battery 10 seated on a tray 12. The tray 12 has front and rear walls 14 and 16 and side walls 18 and 20. The side walls 18 and 20 have holddown projections 22 and 24 respectfully and the front wall 14 has a retention lip 26. A stanchion or vertical holddown member 28 extends upward from the front wall 14. The stanchion 28 has a plurality of ribs 30 each of which has a notch or recess 32 formed therein.

The battery 10 has a pair of holddown extensions 34 formed on a side wall 36, a pair of holddown extensions 38 formed on a side wall 40 and a holddown extension 42 formed on a front wall 44. A handle 46 is pivotally mounted on hinges 48 and 50 disposed on the side walls 36 and 40 respectively. The handle 46 has a holding portion 52, adapted to be grasped by an operator, and a pair of side members 54 and 56. The side members 54 and 56 have respective openings 58 and 60 which cooperate with the hinges 48 and 50 respectively. Each side member 54 and 56 also has a respective tab 62, 64 which engages a receptive slot 66, 68 on the hinges 48 and 50. The handle 46 is removably secured on the battery 10 by the tab and slot interaction.

Figure 2:
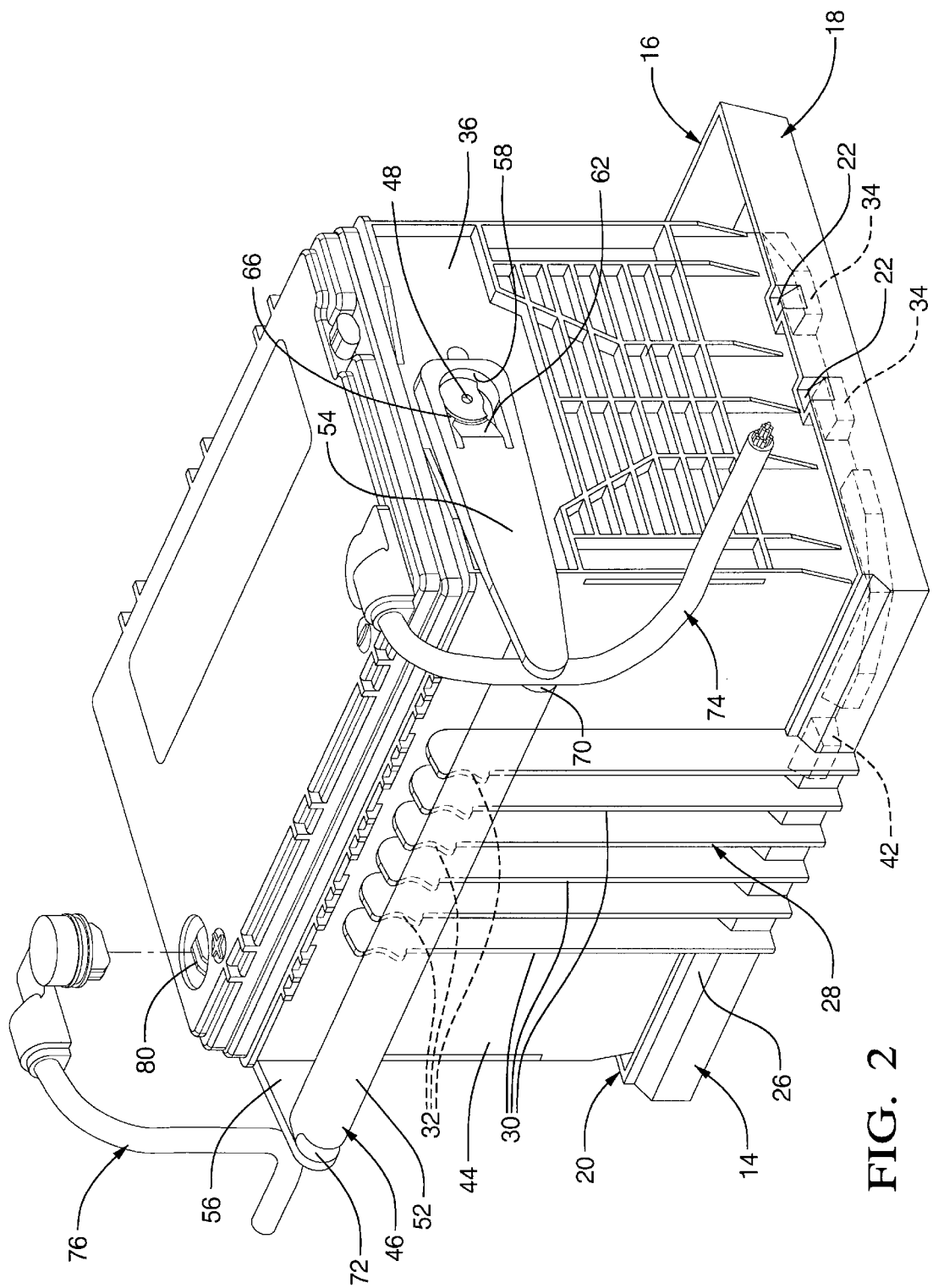
FIG. 2 is an isometric view of the battery installed in the tray incorporating the present invention.
Figure 3:
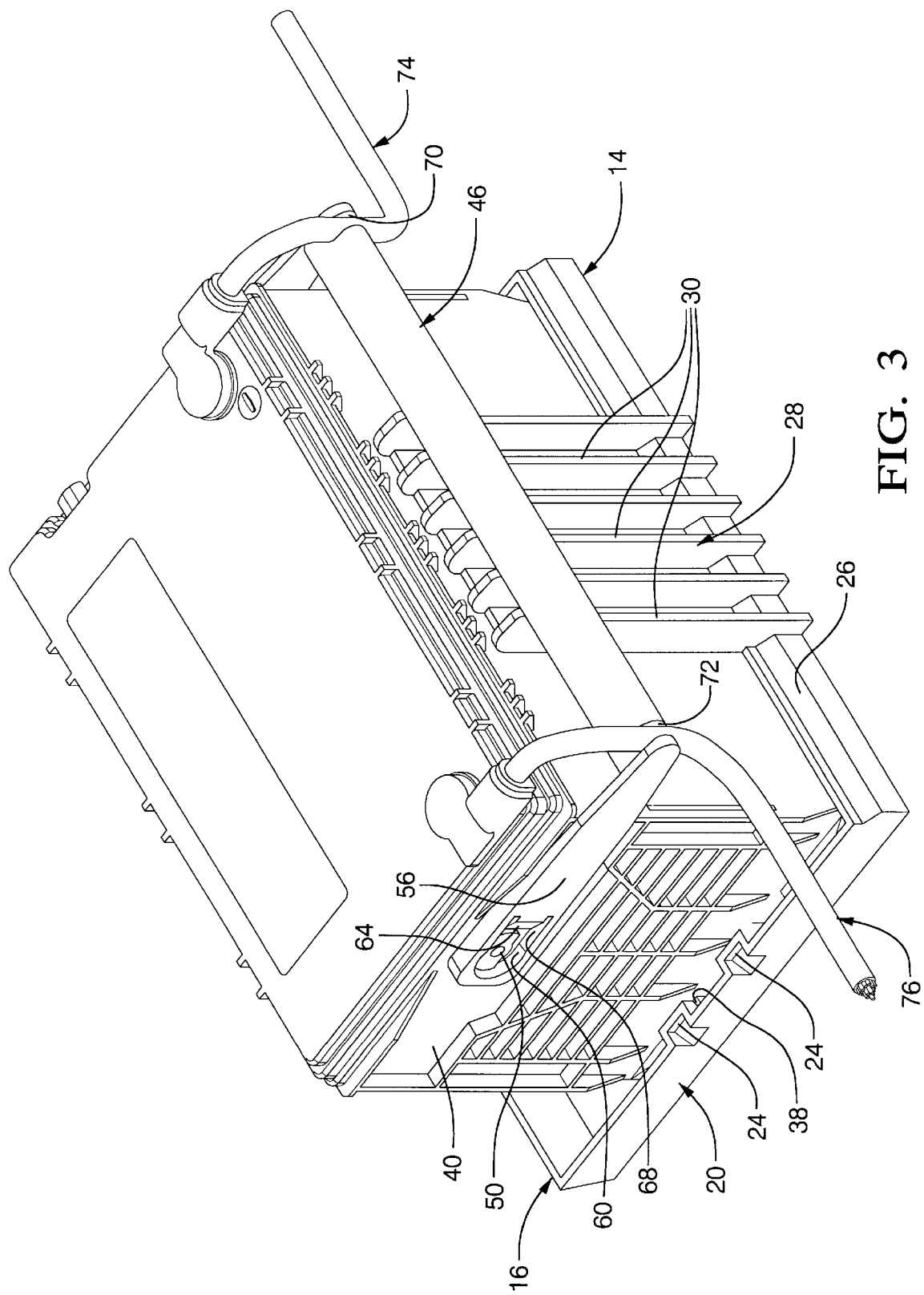
FIG. 3 is another isometric view of the battery installed in the tray incorporating the present invention.
Figure 4:
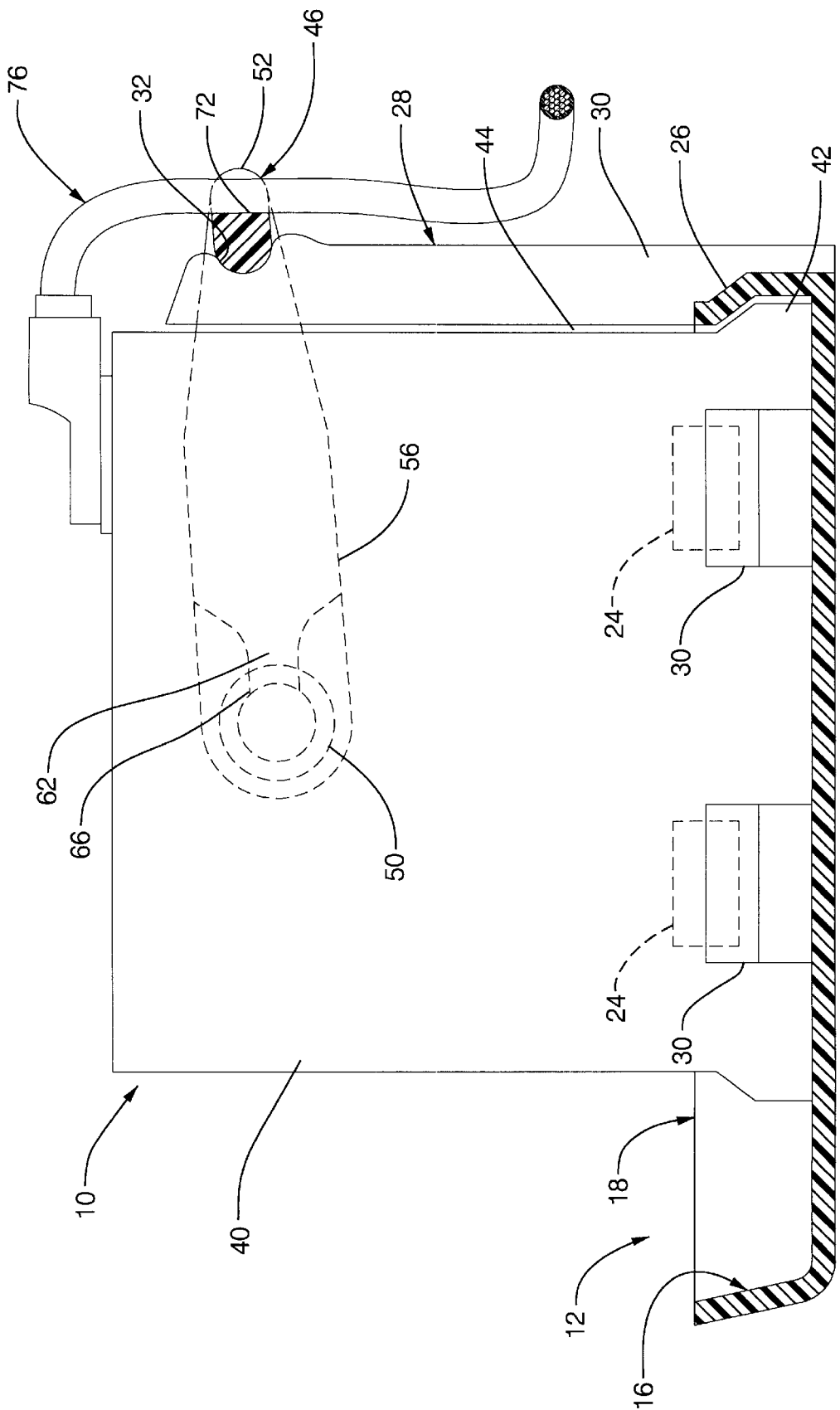
FIG. 4 is a side view, partially in section, of the battery and tray shown in FIGS. 2 and 3.

The holding portion 52 of the handle 46 has a pair of spaced notches or recesses 70 and 72 adjacent the side members 54 and 56 respectively. The notches 70 and 72, as seen in FIGS. 2, 3 and 4 secure respective battery cables 74 and 76 from movement relative to the battery 10. The cable 74 is attached to the negative terminal 78 of the battery 10 and the cable 76 is attached to the positive terminal 80 of the battery 10.

The tray 12 is secured in a vehicle, not shown, in a conventional manner. The battery 10 is placed in the tray 12 with the extensions 34 and 38 displaced from the projections 22 and 24 and the extension 42 displaced from the lip 26 as seen in FIG. 1.

The installer then slides the battery laterally forward on the tray to the position shown in FIG. 2 with the extensions 34 and 38 aligned with the respective projections 22 and 24 and with the extension 42 disposed beneath the lip 26. The installer pivots the handle 46 forward until the holding portion 52 engages in the notches 32 in the ribs 30 of the stanchion 28. The cables 74 and 76 are attached to their respective terminals 78 and 80 and inserted in the notches 70 and 72 as seen in FIGS. 2 and 3.

This will secure the battery 10 both vertically and horizontally in the tray 12. It will be appreciated that this is accomplished without the use of any tools. The maneuver is quite simple and the handle makes manipulation of the battery easy for the installer since an additional carrying device is not needed. The installers hands do not have to contact the sides and bottom of the battery during transport to the vehicle and do not come in contact with the tray. The installer simply slides the battery forward by pushing on the rear wall of the battery.

Removal of the battery 10 is equally simple. The cables 74 and 76 are removed from the notches 70 and 72 and from the terminals 78 and 80. The handle 46 is pivoted upward and the battery 10 is pushed toward the rear wall 16 of the tray 12 until the extensions 34 and 36 are free of the projections 22 and 24. Th battery 10 may then be lifted from the tray 12 by the handle 46. As noted above, this operation is performed without the use of extraneous tools.

What is claimed is:

1. A battery to tray securement apparatus comprising:

a battery having spaced side walls and a front wall with each of said walls having a holddown extension thereon;

a tray having spaced side walls and a front wall with each of said walls having a holddown projection thereon covering at least a portion of corresponding ones of said holddown extensions on said battery; and a handle pivotally mounted on said battery having a portion thereof engaging notches in a stanchion on said tray when said holddown projections are in covering relation with said holddown extensions.

2. The battery to tray securement apparatus defined in claim 1 further comprising:

first and second cables attached to said battery at a positive terminal and a negative terminal respectively;

spaced first and second retention notches formed in said handle and said first and second cables being retained in respective ones of said first and second slots.

3. A battery to tray securement apparatus comprising:

a tray having at least three walls with a first and second of said walls being laterally spaced and joined by a third of said walls, each of said walls having a projecting structure formed integrally therewith and an upright extension formed integral with said third wall;

a battery having a front wall with a first extension formed thereon and being disposed in engaging relation with said structure on said third wall, first and second side walls each having an extension formed integrally therewith and being disposed in engaging relation with respective ones of said structures on said first and second walls of said tray; and a handle pivotally mounted on said first and second side walls, said handle being pivoted for engagement with said upright extension when said structures and said extensions are in said engaging relation.

4. The battery to tray securement apparatus defined in claim 3 further comprising:

said battery having a positive terminal and a negative terminal;

first and second cables attached to said battery at said positive terminal and said negative terminal respectively;

spaced first and second recesses formed in said handle and said first and second cables being retained in respective ones of said first and second slots.

* * * * *